United States Patent
Weidmann

(10) Patent No.: US 11,367,924 B2
(45) Date of Patent: Jun. 21, 2022

(54) PRESSURE-RELIEF COVER FOR REDUCING PRESSURE ARISING IN A CELL-LIKE CAVITY, SUCH AS A BATTERY CELL

(71) Applicant: HUGO BENZING GMBH & CO. KG, D-70825 Korntal-Münchingen (DE)

(72) Inventor: Stephan Weidmann, Stuttgart (DE)

(73) Assignee: HUGO BENZING GMBH & CO. KG, Korntal-Münchingen (DE)

( * ) Notice: Subject to any disclaimer, the term of this patent is extended or adjusted under 35 U.S.C. 154(b) by 134 days.

(21) Appl. No.: 16/349,132

(22) PCT Filed: Nov. 8, 2017

(86) PCT No.: PCT/EP2017/078583
§ 371 (c)(1),
(2) Date: May 10, 2019

(87) PCT Pub. No.: WO2018/087136
PCT Pub. Date: May 17, 2018

(65) Prior Publication Data
US 2019/0280269 A1    Sep. 12, 2019

(30) Foreign Application Priority Data

Nov. 11, 2016   (DE) ..................... 10 2016 121 605.4

(51) Int. Cl.
*H01M 50/333*   (2021.01)
*F16K 17/04*    (2006.01)
*F16K 24/04*    (2006.01)

(52) U.S. Cl.
CPC ....... *H01M 50/333* (2021.01); *F16K 17/0413* (2013.01); *F16K 17/0493* (2013.01); *F16K 24/04* (2013.01)

(58) Field of Classification Search
CPC .................................................... H01M 50/333
See application file for complete search history.

(56) References Cited

FOREIGN PATENT DOCUMENTS

| DE | 10 2011 109 243 A1 | 2/2013 |
|----|--------------------|--------|
| DE | 10 2011 109 310 A1 | 2/2013 |

(Continued)

OTHER PUBLICATIONS

European Patent Office, English language version of the International Search Report, Form PCT/ISA/210 for International Application PCT/EP2017/078583 (3 pages).

*Primary Examiner* — Brian R Ohara
(74) *Attorney, Agent, or Firm* — Pauley Erickson & Swanson

(57) ABSTRACT

A pressure relief cover for reducing pressure generated in a cell-like cavity, such as a battery cell, having a cover part which holds a seal for sealing a housing opening up to a predetermined cell pressure and having a holding device to fasten it to the housing opening. An advantageous type of mounting with a reliable function is achieved in that the holding device has a spring clip attached to the underside of the cover part at the housing opening with a plurality of radially outwardly directed spring tongues which at their ends are provided with spring sections which are resiliently movable backward in the radial direction upon pressing the cover part onto the housing opening through the opening edge and snap back under a wall area around the opening edge after penetrating the housing opening.

19 Claims, 2 Drawing Sheets

(56) References Cited

FOREIGN PATENT DOCUMENTS

| | | | |
|---|---|---|---|
| DE | 102011109243 A1 * | 2/2013 | .......... H01M 2/1276 |
| DE | 10 2013 016 668 A1 | 4/2015 | |
| DE | 102013016668 A1 * | 4/2015 | .......... H01M 2/1276 |
| DE | 10 2014 111 041 A1 | 2/2016 | |
| DE | 10 2015 011 663 A1 | 7/2016 | |
| EP | 1 336 210 A1 | 8/2003 | |
| JP | 2000-104514 A | 4/2000 | |
| WO | WO 02/35618 A1 | 5/2002 | |

* cited by examiner

PRESSURE-RELIEF COVER FOR REDUCING PRESSURE ARISING IN A CELL-LIKE CAVITY, SUCH AS A BATTERY CELL

BACKGROUND OF THE INVENTION

Field of the Invention

This invention relates to a pressure relief cover for reducing pressure generated in a cell-like cavity, such as a battery cell, with a cover part having a seal for sealing a housing opening up to a predetermined cell pressure and provided with a holding device, having a spring clip having a plurality of radially outward-directed spring tongues at an underside of the cover part facing the housing opening, which have spring portions troughed downwards at an end facing away from the cover part to hold the pressure relief cover against the housing opening.

This invention also relates to a cell-like cavity with a pressure relief cover.

Discussion of Related Art

A pressure relief cover or a cavity is shown in German Patent Reference DE 10 2011 109 243 A1. The pressure relief cover has a cover part with a seal for sealing a housing opening up to a predetermined cell pressure and a holding device for holding the pressure relief cover against the housing opening. The holding device includes a spring clip with a plurality of radially outward-directed spring tongues, each of which has a troughed spring portion that is formed away or downward from the cover part and that presses the cover part having the seal with predetermined contact pressure close to the opening edge. Further, the holding device has additionally radially projecting retaining fingers, which push the cover part against the opening edge when the contact pressure is exceeded in the lifted stage via an internal pressure of the cavity, which is delimited by the opening. To mount the spring clip to the cover part, the cover part has a central retaining lug, which is positively encompassed by cutting claws in the central region of the spring clip. The mounting of the pressure relief cover to a housing opening requires several steps.

Similar pressure relief covers as those in German Patent References DE 10 2011 109 243 A1, DE 10 2013 016 668 A1 and DE 10 2011 109 310 A1.

Another pressure relief cover is specified in German Patent Reference DE 10 2014 111 041 A1. With this known pressure relief cover, a degassing valve is formed in particular in connection with a housing of a battery of a motor vehicle, wherein a membrane of the degassing valve is pressed against a support element by a clamping frame with a predetermined contact pressure. At a certain release force, the membrane separates from the support element and releases a fluid channel between the interior of the housing and an environment of the housing. The degassing valve has at least one spring element to push the clamping frame in the direction of the support element. The degassing valve is fixed to an opening of the housing by a housing body and secured on the housing by a nut.

German Patent Reference DE 10 2015 011 663 A1 shows a further pressure relief cover in connection with an emergency degassing device, wherein a housing opening is covered by a cover part which deforms in the housing interior under an increased pressure, and wherein an adjustable display component is provided for displaying the deformation, with the component being in contact with the cover part.

SUMMARY OF THE INVENTION

One object of this invention is to provide a pressure relief cover of the type mentioned, which functions reliably, is easy to assemble and which can be mounted at the opening of a cell-like cavity such as a battery cell, and to provide a container with a cell-like hollow body, which is protected against excessive pressure build-up.

This object and others are achieved with the features described in this specification and the claims. In this case, the spring portions in their longitudinal section radially extending downwards from the cover part are troughed away so that they can be resiliently moved back in the radial direction through the opening edge when the cover part is pressed onto the housing opening through the opening edge and snap back under a wall area around the opening edge after penetrating the housing opening with the free end portions of their radially extending outer trough legs.

The pressure relief cover designed in such a manner has only a few parts and can easily be mounted to the opening of a cell-like cavity, such as a battery cell, by being pushed in from the outside, the outer trough legs being deflected when pushing the pressure relief cover through the inside of the edge radially delimiting the opening inwardly, wherein the free end portions then snap back under the wall area of the opening edge, with the cover part sealing the opening with its seal. After being fixed, the cover part with the seal can lift off from the outside of the wall area around the opening edge when the internal pressure of the battery cell exceeds a predetermined pressure threshold, wherein the pressure threshold can be predetermined by the spring force of the spring tongues. As long as the internal pressure of the battery cell is lower than the predetermined pressure threshold or decreases again after a pressure reduction in the cell, the cover part with the seal is or is again pressed against the wall area around the opening edge by the spring force of the spring tongues. The pressure threshold can be set relatively low, such as below 1 bar, for example in the range of one tenth of a bar. In addition to battery or accumulator cells, the use of other cell-like cavities is also possible, such as a closed container in which pressure can build up, which then causes a risk of bursting, such as a storage container in an aircraft.

One advantageous design of the pressure relief cover in which the spring clip is formed and attached is that a central area of the spring clip is attached with a central area to a centrally arranged holding section of the cover part.

The following measures are advantageous as well for mounting and functional purposes. The spring sections are troughed in a U-shape in their longitudinal section extending in a radial direction, which faces downward away from the cover part, and the free edge of the radially extending outer U-leg forms a support surface, even if, for example, linear, which engages under the wall area around the housing opening. The U-shaped depression results in a free outer leg, which, when mounted, can resiliently move through the opening edge in a radially inward direction and then resiliently move back in a radially outward direction.

In one embodiment for the structure and function, at least a part of the spring portions is spaced far enough from the underside of the cover part so that, in the mounted state, the seal is held under pressure on the top of the wall area around the opening edge.

In another embodiment, a further part of the spring portions is spaced from the underside of the cover part so that they are spaced from the underside of the wall area around the opening edge in the mounted state. This prevents the pressure relief cover from being inadvertently moved away from the area of the housing opening under excessive pressure. The ends of the additional spring portions that are further away from the underside of the cover part and therefore from the underside of the wall area around the housing opening result in an unhindered lifting of the cover part from the wall area around the opening when the predetermined pressure threshold is exceeded, but then prevent unintentional complete removal of the pressure relief cover from the area of the opening.

In this case, in one embodiment it is advantageous for the spring tongues, which are connected to the spring portions that are spaced further away from the underside of the cover part are supported and/or reinforced by a support member which is likewise attached to the underside of the cover part. As a result, the spring tongues belonging to the further spring portions are prevented from moving back in a resilient manner.

In addition, one object of this invention is also for a container with at least one cell-like cavity and at least one pressure relief cover to be designed in the manner described above.

BRIEF DESCRIPTION OF THE DRAWINGS

This invention is explained in more detail below in view of embodiments and references to the drawings, wherein.

DETAILED DESCRIPTION OF INVENTION

Figure 1:
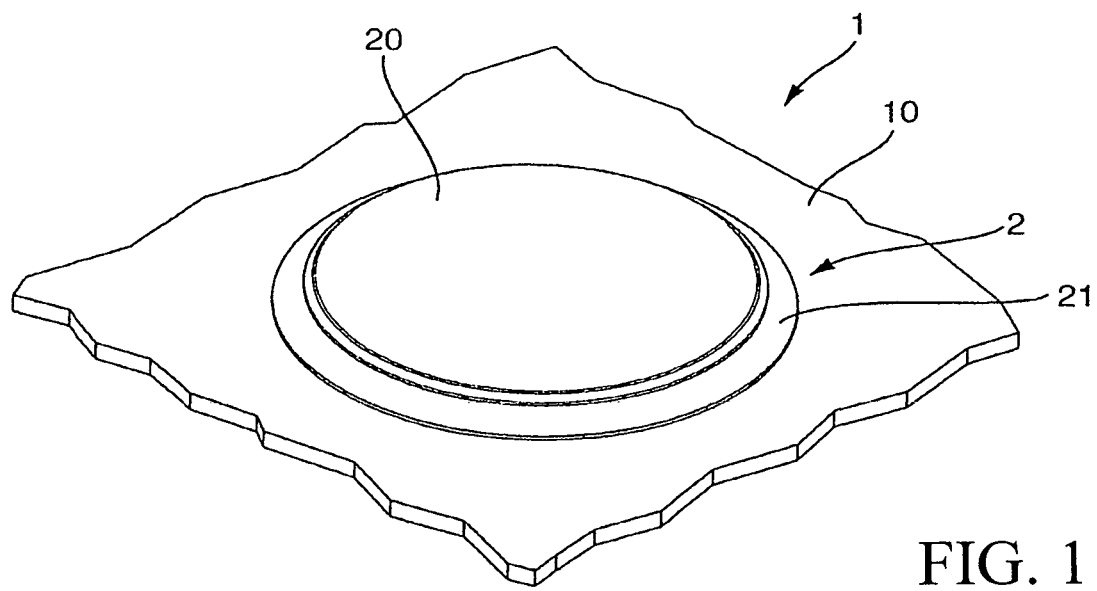
FIG. 1 shows one embodiment of a pressure relief cover inserted into a housing opening of a cell-like cavity, in particular a battery cell, from a top view.
Figure 2:
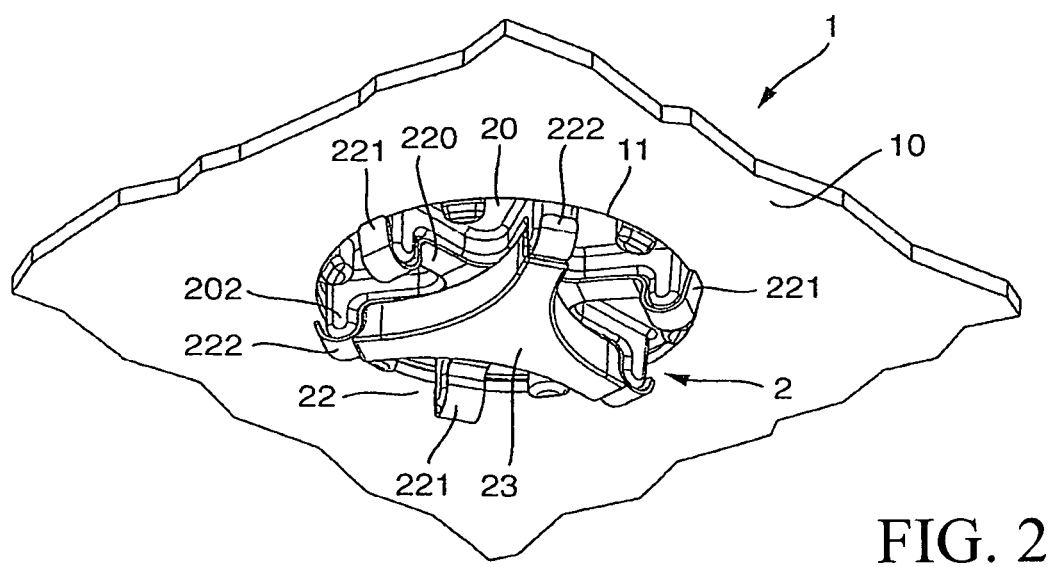
FIG. 2 shows on embodiment of the pressure relief cover of FIG. 1 inserted in a housing opening in a perspective view from below or from the inside, respectively.

FIGS. 1 and 2 show a section of a housing 1 of a cell-like cavity, such as a battery cell, with a housing wall 10 inserted in a housing opening 11 of the battery cell and a pressure relief cover 2 inserted into the housing opening 11 in a perspective view from above and from the underside or inside of the housing 1. The pressure relief cover 2 comprises a cover part 20 resting on the upper side of the housing wall 10 around the edge of the housing opening 11 via a seal 21 and a spring clip 22 fastened to an underside as well as a support member 23 fastened to an underside of the cover part 20 as well. The spring clip 22, which is preferably made of metal, has a plurality of radially outwardly extending spring tongues 220, six in the embodiment shown. The end sections of the spring tongues transition for example in a U-shaped or, for example, V-shaped manner in a downward direction, such as away from the cover part 20, into the troughed spring sections, which engage with their radially extending outer free spring legs under the wall area around the opening edge. Three of the spring tongues 220 are underpinned by the support member 23, so that they can practically not be deflected resiliently in the downward direction, while the remaining three elastic tongues 220 are exposed in the downward direction and can be resiliently deflected. In the circumferential direction, the spring tongues 220 are distributed at equal angular intervals in the embodiment shown, with downward exposed spring tongues 220 supported by the support member 23 in an alternating manner, or the angular distance that results between the individual spring tongues 220 in the direction of rotation is 60 degrees. More than six spring tongues 220 may be provided as well, for example, which are alternately exposed and underpinned.

For example, U-shaped or V-shaped end portions of the spring tongues 220 underpinned or covered by the support member 23 are exposed as well, so that the radially extending outer legs of the troughed spring portions can move inwardly when the pressure relief cover 2 is pressed from above into the housing opening 11, wherein the outer circumference or outer diameter of the radially extending outer U-legs or V-legs is slightly larger in the area of their free ends than the circumference or diameter of the housing opening 11 to be associated. Furthermore, the free ends of the radially extending outer U-legs or V-legs of the spring portions 221, 222 are so far away from the underside of the cover part 20 and the seal 21 resting on it that the outer legs, after penetrating through the housing opening 11 at the underside of the wall area, can snap back around the opening edge. In any case, the radially extending outer legs of the troughed spring portions, such as for example the outer U-legs or the V-legs, are opened outwardly against the pressure direction in a sufficiently acute angle compared to the surface normals of the cover part 20, for example less than 45° or less than 60°, so that they can safely be deflected inwardly against their elastic spring force when the pressure relief cover is mounted.

Figure 3B:
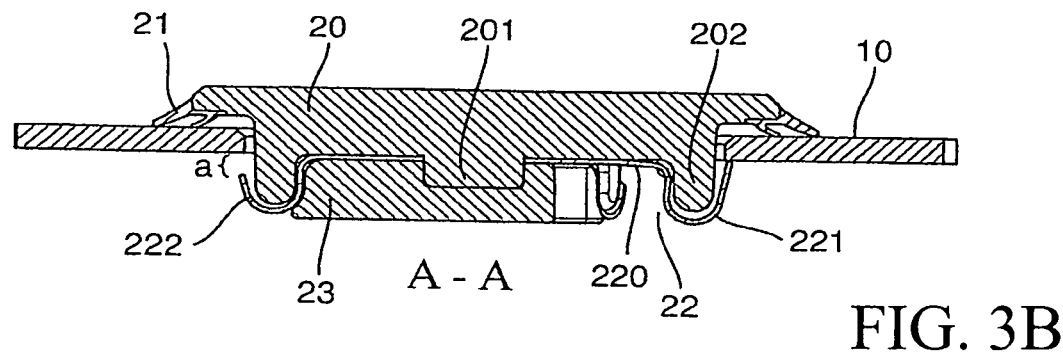
FIG. 3B shows a cross-section of a housing wall and of the pressure relief cover inserted into a housing opening along a section line A-A.

As shown in more detail from FIGS. 2 and 3B, the distance between the free ends of the outer U-legs from the underside of the cover part 20 is less in the unsupported spring tongues 220 than in the spring tongues 220 supported by the support part 23, or the sides of the U-shape of the unsupported spring tongues 220 form long spring portions 221 and the outer U-legs of the supported spring tongues 220 form short spring portions 222. The long spring portions 221 are dimensioned so that the free ends of the long spring portions 221 formed as support surfaces are supported in the pressed state of the cover part 20 and a slightly compressed seal 21 at the underside of the wall portion around the opening edge of the housing opening 11 under tension. To snap in the long spring portions 221 under the wall area around the opening edge, the cover part 20 is pressed against the top or outer side of the wall area around the opening edge until the existing seal 21 made from elastic material is deformed enough to then expand again and to maintain sufficient tension to fulfill its sealing function.

By contrast, the short spring portions 222 are spaced in the inserted state of the pressure relief cover 2 with their free end area by a distance a from the underside of the wall portion around the opening edge. With an internal cell pressure which exceeds the pressure threshold predetermined by the exposed spring tongues 220, the cover part 20 with the seal 21 lifts off from the upper side of the wall area around the housing opening 11, so that the internal pressure in the cell interior decreases. To ensure that the pressure relief cover 2 does not move away from the area of the housing opening 11, the short spring portions 222 are provided, which ensure a sufficient distance a from the lower wall area around the opening edge, so that even at a high internal pressure of the cell, a reliable pressure reduction is ensured by a corresponding ventilation gap, but so that also, on the other hand, the cover is held in the area of the housing opening 11, because the spring tongues 220 belonging to the short spring sections 222 are prevented from resiliently deflecting downward by the support member 23.

Figure 3A:
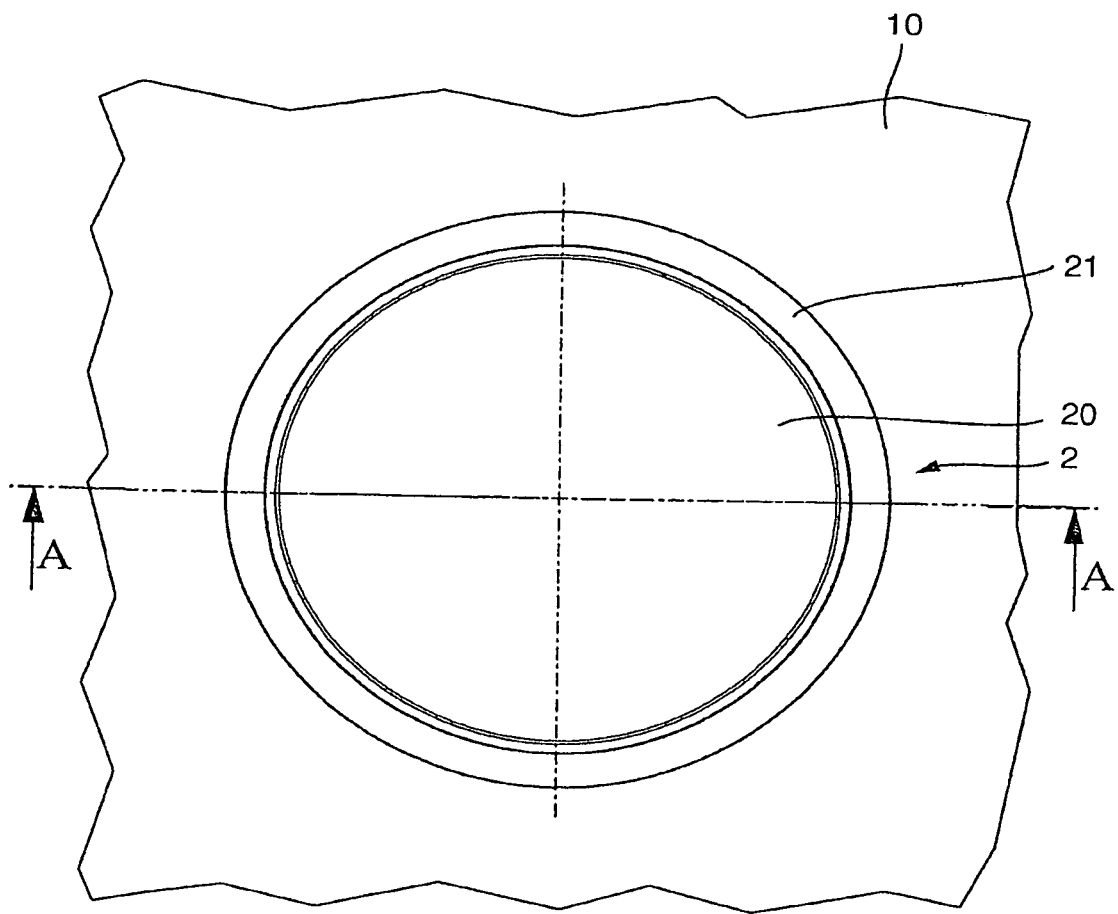
FIG. 3A shows the pressure relief cover inserted in a housing opening from a top view.

The spring clip 22 is advantageously supported by bearing structures 202 on the underside of the cover part 20 and thus positioned as well, with projections engaging in the troughs of the U-shaped spring portions 221, 222, but sufficient clearance for the inward movement of the radially extending outer U-legs is provided. As shown in FIGS. 2 and 3, a central area of the spring clip 22 is attached, for example welded, glued and/or screwed, to a central, downwardly protruding projection of the cover part 20. The relatively rigid support member 23 is also attached to the central holding section 201 of the cover part 20, for example, on the outside of the spring clip 22 together with the same.

The construction described above and shown in the Figures results in an advantageous manner of mounting with a reliable function.

The invention claimed is:

1. A pressure relief cover for reducing a pressure generated in a cavity, comprising:
   a cover part (20) comprising a seal (21) configured to seal a housing opening (11) up to a predetermined cell pressure;
   a holding device comprising:
      a spring clip (22) with a plurality of spring tongues (220), including a first set of unsupported spring tongues and a second set of supported spring tongues, each of the spring tongues (220) including spring portions (221,222) troughed downwards at an end facing away from the cover part (20) to hold the pressure relief cover against the housing opening (11), and
      a support member (23) disposed against and supporting an underside of each of the supported spring tongues (220);
   the spring portions (221, 222) troughed away from the cover part (20) in a longitudinal section extended in a downward radial direction for flexible movement when the cover part (20) is pressed onto the housing opening (11) through an opening edge in the radial direction and, after penetrating the housing opening with free end portions of radially extending outer trough legs, snap back under a wall area around the opening edge.

2. The pressure relief cover according to claim 1, wherein upon the predetermined cell pressure on the cover part (20), the cover part (20) raises off the housing opening (11), first spring portions (221) of the first set of unsupported spring tongues deflect downward, and second spring portions (222) of the second set of supported spring tongues contact the housing opening (11), wherein the support member prevents the second spring portions (222) from deflecting downward.

3. The pressure relief cover according to claim 1, wherein second spring portions (222) of the second set of supported spring tongues are offset by a distance (a) from first spring portions (221) of the supported spring tongues.

4. The pressure relief cover according to claim 1, wherein a central area of the spring clip (22) is attached to a centrally arranged holding section (201) of the cover part (20).

5. The pressure relief cover according to claim 4, wherein a central area of the support member (23) is attached to the centrally arranged holding section (201) of the cover part (20).

6. The pressure relief cover according to claim 4, wherein the spring portions (221, 222) include U-shaped depressions in a radially extending longitudinal direction, which face downward away from the cover part (20), and a free edge of the radially extending outer U-legs forms a support surface engaging below.

7. The pressure relief cover according to claim 4, wherein at least a part of the spring portions (221) of the unsupported spring tongues is spaced far enough from the underside of the cover part (20) so in the mounted state the seal (21) is held under a pressure on a top of the wall area around the opening edge.

8. The pressure relief cover according to claim 7, wherein a further part of the spring portions (222) of the supported spring tongues is spaced from the underside of the cover part (20) so that they are, in the mounted state, spaced from the underside of the wall portion around the opening edge.

9. The pressure relief cover according to claim 8, wherein the cavity is a cell of a battery or an accumulator.

10. The pressure relief cover according to claim 1, wherein the cavity is a cell of a battery or an accumulator.

11. The pressure relief cover according to claim 1, wherein the spring portions (221, 222) include U-shaped depressions in a radially extending longitudinal direction, which face downward away from the cover part (20), and a free edge of the radially extending outer U-legs forms a support surface engaging below.

12. The pressure relief cover according to claim 1, wherein at least a part of the spring portions (221) of the unsupported spring tongues is spaced far enough from the underside of the cover part (20) so in the mounted state the seal (21) is held under a pressure on a top of the wall area around the opening edge.

13. The pressure relief cover according to claim 12, wherein a further part of the spring portions (222) of the supported spring tongues is spaced from the underside of the cover part (20) so that they are, in the mounted state, spaced from the underside of the wall portion around the opening edge.

14. The pressure relief cover according to claim 1, wherein a central area of the support member (23) is attached through spring clip (22) to a centrally arranged holding section (201) of the cover part (20).

15. The pressure relief cover according to claim 1, further comprising a bearing structure (202) disposed between the cover part (20) and the spring clip (22), the bearing structure (202) comprising projections engaging in troughs of the spring portions (221, 222) with clearance for the flexible movement of the spring portions (221, 222).

16. The pressure relief cover according to claim 1, wherein the free end portions of the radially extending outer trough legs are configured to flex inward against the opening edge of the housing opening when the cover part (20) is pressed onto the housing opening (11) and after penetrating the housing opening snap back under the wall area around the opening edge.

17. The pressure relief cover according to claim 1, wherein the first set of unsupported spring tongues includes three unsupported spring tongues and the second set of supported spring tongues includes three supported spring tongues.

18. The pressure relief cover according to claim 1, wherein the free end portions of each trough of the spring portions is curved back toward the cover part to be disposed toward the wall area around the opening edge.

19. The pressure relief cover according to claim 1, wherein a first surface of each of the supported spring tongues is supported against a portion of the cover part, and an opposite second surface of the each of the supported spring tongues is supported against the support member.

\* \* \* \* \*